United States Patent [19]

Felix et al.

[11] Patent Number: 4,526,768
[45] Date of Patent: Jul. 2, 1985

[54] PROCESS FOR PRODUCING SULPHURIC ACID

[75] Inventors: Noël F. Felix, Wijgmaal-Leuven; Guido C. Vermeylen, Edegem, both of Belgium

[73] Assignee: Metallurgie Hoboken-Overpelt, Brussels, Belgium

[21] Appl. No.: 551,079

[22] Filed: Nov. 14, 1983

Related U.S. Application Data

[63] Continuation of Ser. No. 426,099, Sep. 28, 1982, abandoned.

[30] Foreign Application Priority Data

Oct. 26, 1981 [LU] Luxembourg ............................ 83715

[51] Int. Cl.³ .............................................. C01B 17/90
[52] U.S. Cl. .................................... 423/531; 423/522; 423/210.5
[58] Field of Search ............... 423/522, 531, 532, 533, 423/210 M, 210 R, 535

[56] References Cited

U.S. PATENT DOCUMENTS

| | | | |
|---|---|---|---|
| 1,777,025 | 9/1930 | Allen | 423/529 |
| 2,394,426 | 2/1946 | Carter | 423/522 |
| 2,520,454 | 8/1950 | Carter | 423/529 |
| 3,826,819 | 7/1974 | Orlandini et al. | 423/561 B |
| 3,873,581 | 3/1975 | Fritzpatrick et al. | 423/531 |
| 3,932,149 | 1/1976 | Melkersson | 423/531 |
| 3,947,561 | 3/1976 | Zunkel | 423/531 |
| 3,954,451 | 5/1976 | Kinoshita | 423/561 B |

OTHER PUBLICATIONS

Duecker et al., The Manufacture of Sulfuric Acid, Rhein Hold Publishing Corp., NY, NY, 1959, pp. 246-255.

Primary Examiner—Gary P. Straub
Attorney, Agent, or Firm—Fred Philpitt

[57] ABSTRACT

In a process for producing sulphuric acid from roasting gas containing $SO_2$, $H_2O$ and Hg, comprising the steps of
(a) drying the gas with $H_2SO_4$
(b) subjecting the gas to a catalytic oxidation treatment so as to produce a $SO_3$ rich gas, and
(c) absorbing the $SO_3$ in concentrated sulphuric acid, while maintaining the concentration of this acid at its initial value by addition of diluted sulphuric acid, the gas from step (b) is scrubbed with oleum, thereby producing in step
(c) $H_2SO_4$ with less than 0.1 mg/l of Hg.

15 Claims, 1 Drawing Figure

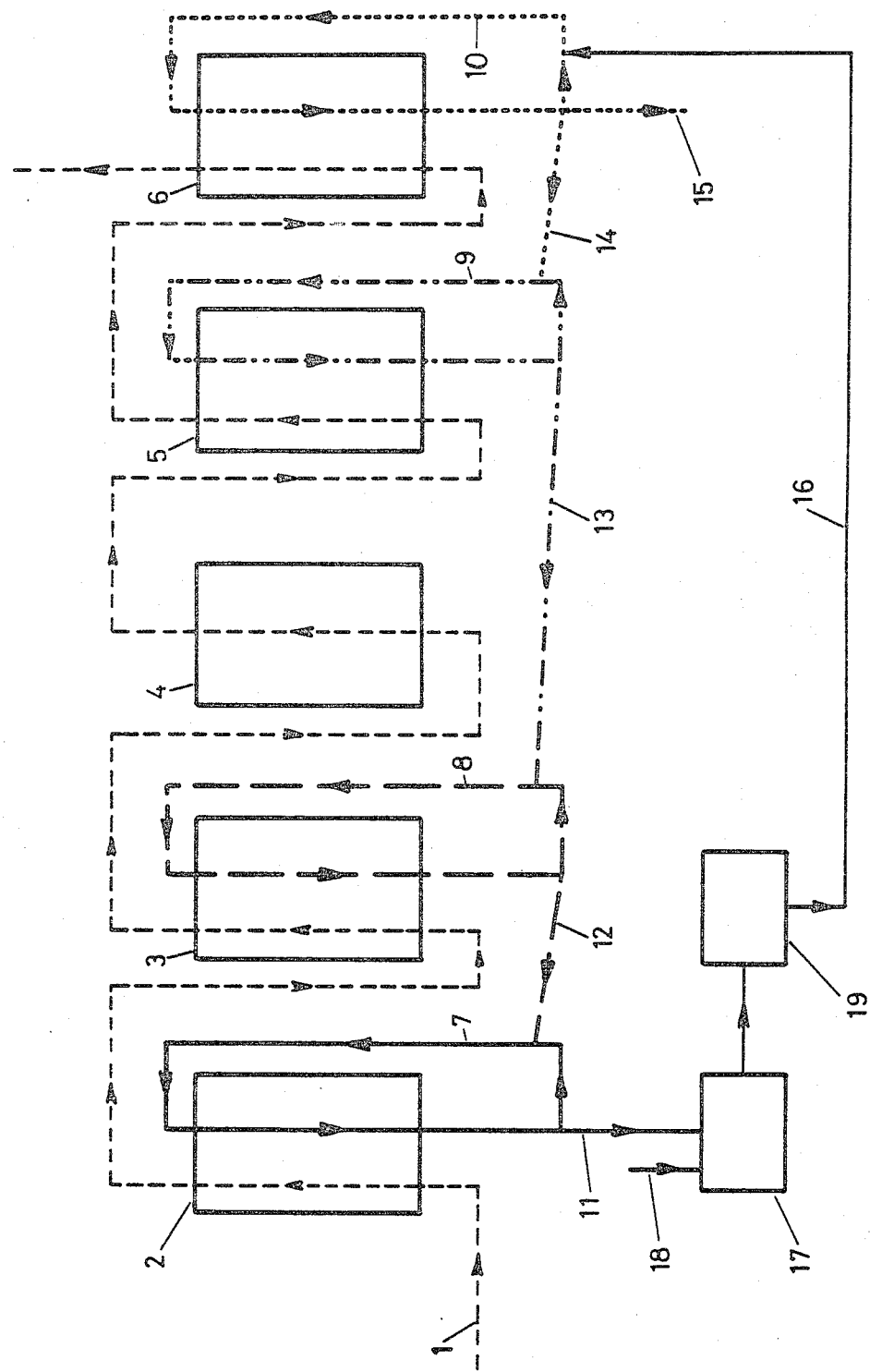

PROCESS FOR PRODUCING SULPHURIC ACID

This is a continuation of application Ser. No. 426,099, filed Sept. 28, 1982, now abandoned, and the benefits of 35 USC 120 are claimed relative to it.

The present invention relates to a process for producing sulphuric acid from roasting gas containing SO2, water-vapour and mercury, comprising following steps:

(a) the gas is contacted with sulphuric acid so as to produce a dry gas, thereby diluting the acid and simultaneously lowering the mercury content of the gas, part of the mercury present in the starting gas passing into the sulphuric acid;

(b) the dry gas is subjected to a catalytic oxidation treatment so as to produce a gas that is rich in SO3;

(c) the gas rich in SO3 is contacted with concentrated sulphuric acid, thereby absorbing the SO3 in this concentrated acid, and the concentration of this acid is maintained at its initial value by adding diluted sulphuric acid; and (d) after having carried out step (a) and before carrying out step (c), the gas is contacted with a sulphating agent containing sulphuric acid so as to lower further the mercury content of the gas.

Such a process is described in the U.S. Pat. No. 3,954,451. In this known process the contacting of the gas with a sulphating agent containing sulphuric acid so as to lower further the mercury content of the gas is carried out before step (b) and sulphuric acid with a concentration of 70 to 99 percent (by weight), preferably 98 percent, and at a temperature of at least 40° C., preferably 70° to 100° C., is used as a sulphating agent. This known process presents the drawback that the gas rich in SO3 that reaches step (c) still contains an important quantity of mercury that is afterwards found in the final product, namely in the concentrated sulphuric acid produced in step (c).

The aim of the present invention is to provide a process such as defined before, avoiding the above-mentioned drawback of the known process.

According to the invention, the contacting of the gas with a sulphating agent containing sulphuric acid so as to lower further the mercury content of the gas is carried out after step (b) and oleum is used as a sulphating agent.

In a mode for carrying out the process of the invention that is illustrated by the enclosed schematic drawing, a gas, produced at the agglomerating roasting of a non-ferrous metal sulphide concentrate on an endless grate, is used.

Gas 1, that was already dedusted in a non-represented conventional dedusting installation, is brought successively through a first drying tower 2, a second drying tower 3, a catalytic converter 4, an oleum scrubber 5 and an absorption tower 6.

Acid 7 with a concentration of about 78 percent is circulated in the first drying tower 2, acid 8 with a concentration of about 96 percent in the second drying tower 3, oleum 9 with a concentration of about 104 percent in scrubber 5 and acid 10 with a concentration of about 96.5–98.5 percent in the absorption tower 6.

In order to maintain the concentration of acid 7, that circulates in the first drying tower, at about 78 percent, a fraction 11 is tapped therefrom and a fraction 12, that is tapped from acid 9, circulating in the second drying tower 3, is added thereto. In order to maintain the concentration of acid 8, that circulates in the second drying tower at about 96 percent the before-mentioned fraction 12 is tapped therefrom and a fraction 13, that is tapped from oleum 9 circulating in scrubber 5, is added thereto. Fraction 13 tapped from the oleum 9, that circulates in scrubber 5, is replaced in that scrubber by a fraction 14, that is tapped from acid 10 circulating in the absorption tower 6. In order to maintain the concentration of acid 10, that circulates in the absorption tower 6, at about 96.5–98.5 percent, the before-mentioned fraction 14 as well as fraction 15, that constitutes the end product of the process, is tapped therefrom and mercury free acid 16 with a concentration of about 78 percent is added thereto. This acid 16 is produced from the before-mentioned fraction 11, to which a mercury precipitating agent 18 such as e.g. sodium thiosulphate is added in 17 and from which the mercury precipitate is separated in 19.

The temperature prevailing in the oleum scrubber 5 is about 60°–100° C., since the gas leaving the catalytic converter 4 is at a temperature of about 180°–250° C.

Gas 1 entering the first drying tower 2 may contain, for example, 5 percent in volume of SO2, 25 g/Nm3 of H20 and 13 mg/Nm3 of Hg and the end-product, namely fraction 15, contains less than 0.1 mg/l of Hg.

It should be noted that the precipitation of mercury in sulphuric acid by a thiosulphate is described in detail in the U.S. Pat. No. 3,932,149 and that other mercury precipitating methods, that can also be used in combination with the process of the present invention, are described in the before-mentioned U.S. Pat. No. 3,954,451.

It should also be noted that there is no need to dispose of oleum to start the process of the invention, because the applicants found that the mercury that is present in the gas from converter 4 is as effeciently absorbed by concentrated sulphuric acid as by oleum. Hence, at the starting up of the above-described installation, concentrated sulphuric acid can be circulated in scrubber 5, e.g. acid with a concentration higher than 70 percent, that will convert into oleum at the contact with gases from converter 4. Once the installation reaches its normal working conditions, the concentration of this oleum will depend on the SO3 content of the gases from converter 4 and on the temperature prevailing in scrubber 5.

It should also be noted that the temperature prevailing in the oleum scrubber 5 is not critical, because the applicants found that the mercury that is present in the gas from converter 4 is as efficiently absorbed by oleum at 20° C. as by oleum at 80° C.

It is to be understood that the process of the invention is not restricted to the above described embodiment and that it can be modified in many ways. If, for instance, a starting gas 1 is used with a high SO2:H2O ratio, not enough acid 16 is produced to keep the concentration of acid 10 at the desired level; in that case, water is added either to the circuit of acid 10 or to the fraction 11 before, during or after its treatment.

On the other hand, if a starting gas 1 is used with a low SO2:H2O ratio, too much acid 16 is produced to keep the concentration of acid 10 at the desired level; in that case, a part of acid 16 is tapped and this tapped part can, for instance, be commercialized as diluted acid. If, for instance, a rather dry starting gas 1 is used, only one drying tower can be used instead of two.

In order to maintain the concentration of the acid 8 circulating in the second drying tower 3 at the desired value it is also possible to add thereto, instead of the fraction 13 tapped from the oleum 9 circulating in scrubber 5, the fraction 14 tapped from acid 10, that circulates in the absorption tower 6; in this alternative, the mercury can be accumulated in the oleum 9, that circulates in the scrubber 5, to a very high content and, to avoid that this content exceeds an unallowed value, it will be sufficient to tap from this oleum 9 a small fraction, that can for instance be added to the fraction 11 and that is replaced by a fraction tapped from the acid 10 circulating in the absorption tower 6.

EXAMPLE

This example relates to a series of tests carried out in a conventional installation for producing sulphuric acid from roasting gases. This installation comprises a first drying tower, a second drying tower, a catalytic converter and an absorption tower. It treats 8.5 Nm3/second of mercury containing roasting gas produced at the agglomerating roasting of a lead sulphide concentrate on an endless grate.

For an eight days period a small amount of the gases, that pass from the second drying tower to the converter, is diverted towards a test scrubber containing hot 98% sulphuric acid, through which the diverted gases are passed, thereby subjecting said gases to step (d) of the prior art process described in the above mentioned U.S. Pat. No. 3,954,451.

The test scrubber has a diameter of 20 cm and a height of 100 cm; it is filled up with Raschig rings and heated to 80° C.

The 98% acid in the scrubber is production acid containing about 1,5 mg/l of Hg.

The gases that leave the test scrubber are passed through a conventional mercury analyser comprising a sodium hydroxide scrubber followed by a potassium permanganate scrubber. In this way, the mercury content of the gases that leave the test scrubber is measured.

The flow of the gases sent to the test scrubber and the mercury content of the acid in said scrubber are also measured regularly.

The results of these measurements are tabulated in table 1 hereafter.

TABLE 1

I = day
II = average gas flow, in Nm3/hour
III = average mercury content of the acid, in mg/l
IV = average mercury content of the gases leaving the test scrubber, in mg/Nm3

| I | II | III | IV |
|---|---|---|---|
| 1st | 2.1 | 1.67 | 0.085 |
| 2nd | 2.2 | 1.41 | 0.077 |
| 3th | 2.1 | 1.64 | 0.070 |
| 4th | 2.0 | 1.52 | 0.145 |
| 5th | 2.2 | 1.52 | 0.139 |
| 6th | 2.2 | 1.45 | 0.201 |
| 7th | 2.0 | 1.41 | 0.132 |
| 8th | 2.1 | 1.43 | 0.091 |

The data of table 1 show that the mercury content of the acid in the test scrubber remains nearly the same for the whole test period (see column III), which means that said acid does not remove mercury from the gases leaving the second drying tower. The gases leaving the test scrubber contain some days more than 0.130 mg/Nm3 of mercury (see column IV). If such gases were sent through a catalytic converter to an absorption tower, as proposed by the prior art according to the above mentioned U.S. Pat. No. 3,954,451, the acid produced in the absorption tower would surely have a mercury content of more than 1 mg/l.

For the same eight days period there is also diverted a small amount of the gases, that pass from the converter to the absorption tower, towards a test scrubber containing oleum, through which the diverted gases are passed, thereby subjecting said gases to step (d) of the process of the present convention.

The test scrubber has the same size as the above described one and it is also filled up with Raschig rings. It is heated to 80° C., which is nearly the temperature that would prevail in an industrial scrubber installed just downstream the converter, since the gases leaving the converter have a temperature of about 200° C.

The oleum contained in the test scrubber was prepared by contacting chemically pure sulphuric acid with gases from the converter, i.e. with gases rich in SO3. Chemically pure sulphuric acid is 93% acid that is commercially available and that contains 0,03 mg/l of Hg.

The gases that leave the oleum test scrubber are passed through a test absorption tower, thereby subjecting said gases to step (c) of the process of the present invention. The test absorption tower is filled up at the beginning of the test run with chemically pure 93% sulphuric acid. As soon as the gases rich in SO3, that leave the oleum test scrubber, start to pass through said 93% absorption acid, the concentration is allowed to increase to 98% and from that moment on that latter concentration is maintained by tapping acid and adding water.

The test absorption tower has the same size as the above described test scrubbers and it is filled up with Raschig rings too. It is also heated to 80° C., which is the temperature that is maintained in an industrial absorption tower.

The gases that leave the test absorption tower are passed through a conventional mercury analyser that is identical to the above described one. In this way the mercury content of the gases that leave the test absorption tower is measured.

The flow of the gases sent to the oleum test scrubber, the H2SO4 content of the oleum, the mercury content of the oleum and the mercury content of the acid in the test absorption tower are also measured regularly.

The results of these measurements are tabulated in table 2 hereafter.

TABLE 2

I = day
II = average gas flow, in Nm$^3$/hour
III = average H2SO4 content of the oleum, in %
IV = average mercury content of the oleum, in mg/l
V = average mercury content of the absorption acid, in mg/l
VI = average mercury content of the gases leving the test absorption tower, in mg/Nm$^3$

| I | II | III | IV | V | VI |
|---|---|---|---|---|---|
| 1st | 1.8 | 104.2 | 1.28 | 0.04 | 0.01 |
| 2nd | 2.0 | 105.9 | 1.43 | 0.06 | " |
| 3th | 1.9 | 105.6 | 1.76 | 0.04 | " |
| 4th | 2.0 | 105.6 | 2.62 | 0.04 | " |
| 5th | 2.1 | 105.3 | 3.04 | 0.05 | " |
| 6th | 2.0 | 106.0 | 3.32 | 0.05 | " |
| 7th | 2.0 | 105.8 | 3.58 | 0.06 | " |
| 8th | 2.0 | 105.5 | 4.11 | 0.04 | " |

The data of table 2 show that the mercury content of the oleum in the test scrubber increases continuously for the whole test period (see column IV), which means that that oleum removed mercury from the gases leaving the catalytic converter. The oleum has removed so much mercury from said gases that the test absorption tower downstream the test scrubber produced sulphuric acid containing appreciably less than 0.1 mg/l of Hg (see column V), i.e. sulphuric acid with a mercury content far below the above-mentioned content of 1 mg/l.

Hence, in a process such as defined in the first paragraph of the present description, it matters to carry out the contacting of the gas with a sulphating agent containing sulphuric acid so as to lower further the mercury content of the gas after step (b). It matters also to use oleum as a sulphating agent containing sulphuric acid; otherwise, the mercury absorption tower would be operated as a SO3 absorption tower and the total amount of the produced sulphuric acid would have an unacceptable mercury content.

We claim:

1. A process for producing sulphuric acid that is substantially free of mercury from a roasting gas containing $SO_2$, water-vapor and mercury comprising the steps of
   (a) contacting the gas with circulating sulphuric acid so as to produce a dry gas, thereby diluting the acid and simultaneously lowering the mercury content of the gas, part of the mercury present in the starting gas passing into the sulphuric acid,
   (b) compensating for the concentration loss in the acid circulating in step (a) by adding thereto oleum and tapping from step (a) a diluted sulfuric acid;
   (c) subjecting the dry gas resulting from step (a) to a catalytic oxidation treatment so as to produce a gas that is rich in $SO_3$,
   (d) contacting the gas rich in $SO_3$ from step (c) with circulating oleum, thereby lowering further the mercury content of the gas,
   (e) tapping from the oleum circulating in step (d) only the amount required in step (b) and maintaining the volume of the circulating oleum in step (d) constant by adding thereto sulphuric acid,
   (f) using the oleum tapped in step (e) in step (b),
   (g) contacting the gas resulting from step (d) with circulating concentrated sulphuric acid, thereby absorbing $SO_3$ in this concentrated acid,
   (h) compensating the concentration increase of the concentrated sulphuric acid circulating in step (g) by adding thereto diluted sulphuric acid or water and tapping therefrom concentrated sulphuric acid, this tapped acid being substantially free of mercury, and
   (i) leading acid tapped in step (h) away as product acid.

2. The process according to claim 1 wherein concentrated sulphuric acid in step (h) is used in step (e).

3. The process according to claim 1 wherein the mercury is precipitated in the diluted acid tapped in step (b), the mercury precipitate is separated from the acid, thereby producing mercury free diluted acid, and this diluted acid is used in step (h).

4. The process according to claim 1 wherein concentrated sulphuric acid tapped in step (h) is used in step (e), the mercury is precipitated in the diluted acid tapped in step (b), the mercury precipitate is separated from the acid, thereby producing mercury free diluted acid, and this diluted acid is used in step (h).

5. A process for producing sulphuric acid that is substantially free of mercury from a roasting gas containing $SO_2$ water-vapor and mercury comprising the steps of
   (a) contacting the gas with circulating sulphuric acid so as to produce a dry gas, thereby diluting the acid and simultaneously lowering the mercury content of the gas, part of the mercury present in the starting gas passing in the sulphuric acid;
   (b) compensating the concentration loss of the acid circulating in step (a) by adding thereto concentrated sulphuric acid and tapping therefrom diluted acid,
   (c) subjecting the dry gas resulting from step (a) to a catalytic oxidation treatment so as to produce a gas that is rich in $SO_3$,
   (d) contacting the gas rich in $SO_3$ from step (c) with circulating oleum, thereby lowering further the mercury content of the gas,
   (e) controlling the mercury content of the oleum circulating in step (d) so that this oleum remains a mercury absorbent by tapping oleum and adding a substantially equal volume of sulphuric acid with a lower mercury content than the tapped oleum,
   (f) contacting the gas resulting from step (d) with circulating concentrated sulphuric acid, thereby absorbing $SO_3$ in this concentrated acid,
   (g) compensating the concentration increase of the concentrated sulphuric acid circulating in step (f) by adding thereto diluted sulphuric acid or water and tapping therefrom concentrated sulphuric acid, this tapped acid being substantially free of mercury,
   (h) leading acid tapped in step (g) away as product acid,
   (i) adding the oleum tapped in step (e) to the diluted acid tapped in step (b), thereby obtaining a less diluted acid and
   (j) precipitating the mercury in the acid obtained in step (i) and separating the mercury precipitate from the acid, thereby producing mercury-free acid.

6. The process according to claim 5 wherein concentrated sulphuric acid tapped in step (g) is used in step (b).

7. The process according to claim 5 wherein concentrated sulphuric acid tapped in step (g) is used in step (e).

8. The process according to claim 5 wherein mercury-free acid produced in step (j) is used in step (g).

9. The process according to claim 5 wherein concentrated sulphuric acid tapped in step (g) is used in step (b) and in step (e) and wherein the mercury-free acid produced in step (j) is used in step (g).

10. A process for producing sulphuric acid that is substantially free of mercury from a roasting gas containing $SO_2$, water-vapor and mercury comprising the steps of
   (a) contacting the gas with circulating sulphuric acid so as to produce a dry gas, thereby diluting the acid and simultaneously lowering the mercury content of the gas, part of the mercury present in the starting gas passing into the sulphuric acid,
   (b) compensating for the concentration loss of the acid circulating in step (a) by adding thereto concentrated sulphuric acid and tapping from step (a) a diluted acid,
   (c) subjecting the dry gas resulting from step (a) to a catalytic oxidation treatment so as to produce a gas that is rich in $SO_3$,
   (d) contacting the gas rich in $SO_3$ from step (c) with circulating oleum, thereby lowering further the mercury content of the gas, (e) controlling the mercury content of the oleum circulating in step (d) so that this oleum remains a mercury absorbent by tapping oleum and adding a substantially equal volume of sulphuric acid that is substantially free of mercury, the tapped and added amounts being substantially the minimal amounts required for said controlling, (f) contacting the gas resulting from step (d) with circulating concentrated sulphuric acid, thereby absorbing $SO_3$ in this concentrated acid, (g) compensating the concentration increase of the concentrated sulphuric acid circulating in step (f) by adding thereto diluted sulphuric acid or water and tapping therefrom concentrated sulphuric acid, this tapped acid being substantially free of mercury, and (h) leading acid tapped in step (g) away as product acid.

11. The process according to claim 10 wherein concentrated sulphuric acid tapped in step (g) is used in step (b).

12. The process according to claim 10 wherein concentrated sulphuric acid tapped in step (g) is used in step (e).

13. The process according to claim 10 wherein the mercury is precipitated in the diluted acid tapped in step (b), the mercury precipitate is separated from the acid, thereby producing mercury-free diluted acid, and this diluted acid is used in step (g).

14. The process according to claim 10 wherein the oleum tapped in step (e) is added to the diluted acid tapped in step (b) thereby obtaining a less diluted acid, the mercury is precipitated in this less diluted acid, the mercury precipitate is separated from the acid, thereby producing mercury-free acid, and this mercury-free acid is used in step (g).

15. The process according to claim 10 wherein concentrated sulphuric acid tapped in step (g) is used in step (b) and in step (e), the oleum tapped in step (e) is added to the diluted acid tapped in step (b), thereby obtaining a less diluted acid, the mercury is precipitated in this less diluted acid, the mercury precipitate is separated from the acid, thereby producing mercury-free acid, and this mercury-free acid is used in step (g).

* * * * *